(12) United States Patent
Segerberg et al.

(10) Patent No.: US 6,910,191 B2
(45) Date of Patent: Jun. 21, 2005

(54) PROGRAM GUIDE DATA SELECTION DEVICE

(75) Inventors: Tomas Segerberg, Motala (SE); Marcus Bernhardson, Linkoping (SE)

(73) Assignee: Nokia Corporation, Espoo (FI)

( * ) Notice: Subject to any disclaimer, the term of this patent is extended or adjusted under 35 U.S.C. 154(b) by 504 days.

(21) Appl. No.: 09/985,307

(22) Filed: Nov. 2, 2001

(65) Prior Publication Data

US 2003/0090524 A1 May 15, 2003

(51) Int. Cl.$^7$ ................................................. G06F 3/00
(52) U.S. Cl. ....................... 715/830; 715/833; 715/828; 715/786; 725/52; 725/45
(58) Field of Search .................... 345/721, 784–787, 345/828–830, 833; 725/45, 52

(56) References Cited

U.S. PATENT DOCUMENTS

| | | | |
|---|---|---|---|
| 5,059,965 A | | 10/1991 | Geiser |
| 5,095,965 A | | 3/1992 | Higashiyama |
| 5,119,079 A | | 6/1992 | Hube et al. |
| 5,283,560 A | | 2/1994 | Bartlett |
| 5,289,573 A | | 2/1994 | Kataoka et al. |
| 5,452,414 A | | 9/1995 | Rosendahl et al. |
| 5,485,175 A | | 1/1996 | Suzuki |
| 5,598,527 A | | 1/1997 | Debrus et al. |
| 5,664,128 A | | 9/1997 | Bauer |
| 5,677,708 A | | 10/1997 | Matthews, III et al. |
| 5,737,029 A | | 4/1998 | Ohkura et al. |
| 5,751,287 A | | 5/1998 | Hahn et al. |
| 5,751,369 A | | 5/1998 | Harrison et al. |
| 5,812,123 A | | 9/1998 | Rowe et al. |
| 5,815,155 A | | 9/1998 | Wolfston, Jr. |
| 5,860,067 A | * | 1/1999 | Onda et al. ..................... 705/9 |
| 6,005,601 A | * | 12/1999 | Ohkura et al. ................. 725/52 |
| 6,008,803 A | * | 12/1999 | Rowe et al. ................... 345/721 |
| 6,016,144 A | | 1/2000 | Blonstein et al. |
| 6,034,688 A | * | 3/2000 | Greenwood et al. ......... 345/784 |
| 6,100,884 A | * | 8/2000 | Tomita et al. ................ 345/721 |
| 6,128,009 A | | 10/2000 | Ohkura et al. |
| 6,175,362 B1 | * | 1/2001 | Harms et al. ................. 345/721 |
| 6,243,071 B1 | | 6/2001 | Shwarts et al. |
| 6,412,110 B1 | | 6/2002 | Schein et al. |
| 6,483,548 B1 | | 11/2002 | Allport |
| 6,538,672 B1 | * | 3/2003 | Dobbelaar .................... 345/810 |
| 6,594,825 B1 | | 7/2003 | Goldschmidt Iki et al. |
| 6,597,358 B2 | | 7/2003 | Miller |
| 6,678,891 B1 | * | 1/2004 | Wilcox et al. ................. 725/42 |

FOREIGN PATENT DOCUMENTS

| | | |
|---|---|---|
| EP | 0 645 604 B1 | 3/1995 |
| EP | 0 682 452 B1 | 11/1995 |
| EP | 0 872 994 | 10/1998 |
| GB | 2 329 813 | 3/1999 |
| WO | WO 99/60470 | 11/1999 |
| WO | WO 00/65429 | 11/2000 |
| WO | WO 00/79374 | 12/2000 |
| WO | WO 01/73596 A2 | 10/2001 |

* cited by examiner

*Primary Examiner*—John Cabeca
*Assistant Examiner*—Shawn M. Becker
(74) *Attorney, Agent, or Firm*—Antonelli, Terry, Stout & Kraus, LLP

(57) ABSTRACT

A digital interactive television set device for selecting program guide data corresponding to available programming content. A processor filters the programming guide data according to different filter categories and also individual filter ranges associated with respective categories, and provides a corresponding display on the television. A graphical user interface provides a horizontal scroll bar with scroll bar elements signifying individual filter ranges of the filter categories, such that when selected individually, scroll bar elements of a vertical scroll bar signify individual program content items from the program data that fall within the filter category and range of the selected horizontal bar element, at least one of the scroll bar elements of the horizontal scroll bar comprising a multiple depiction of more than one of the individual filter ranges of filter categories, whereby an individual one of the filter ranges may be selected from the multiple depiction.

21 Claims, 7 Drawing Sheets

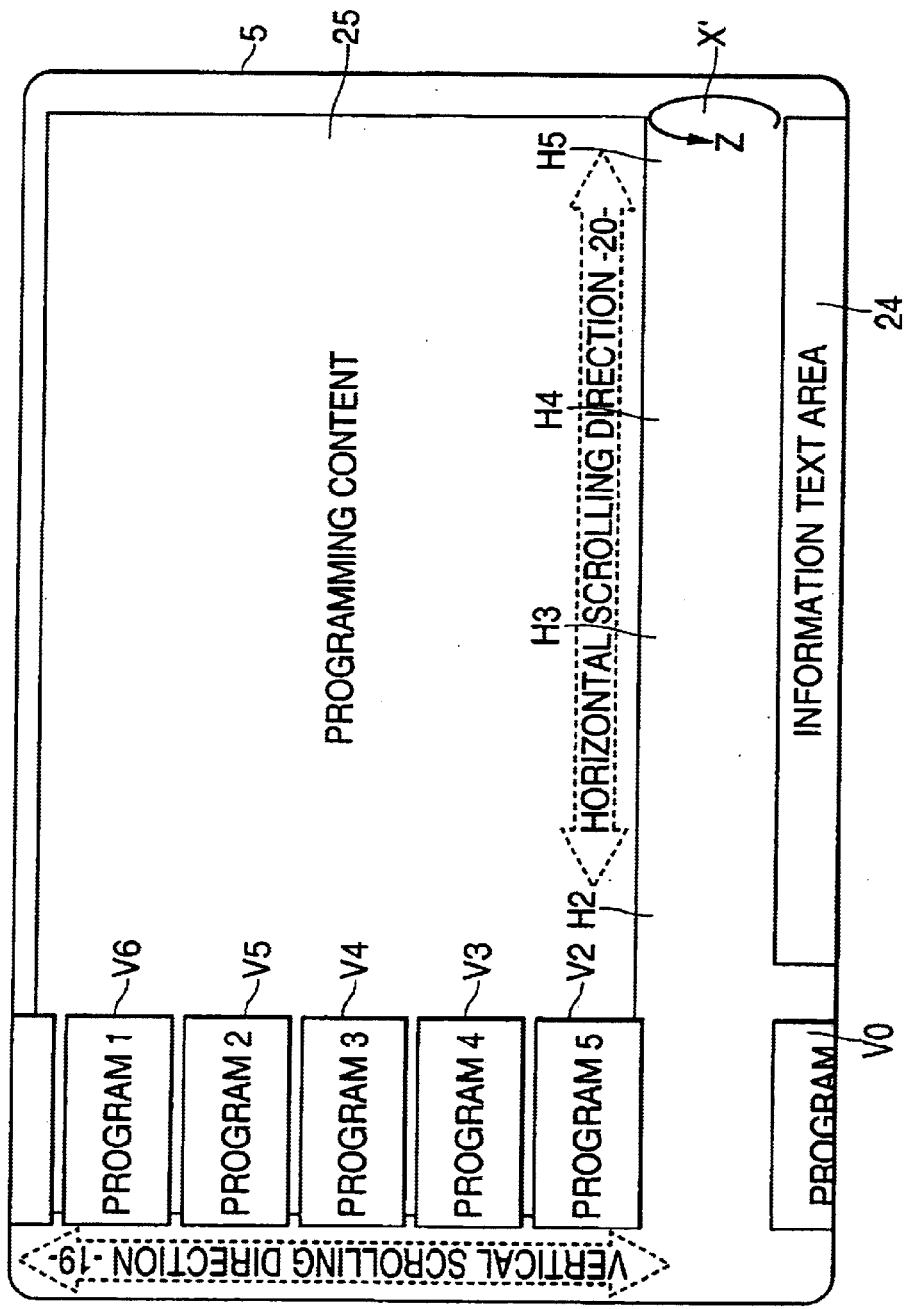

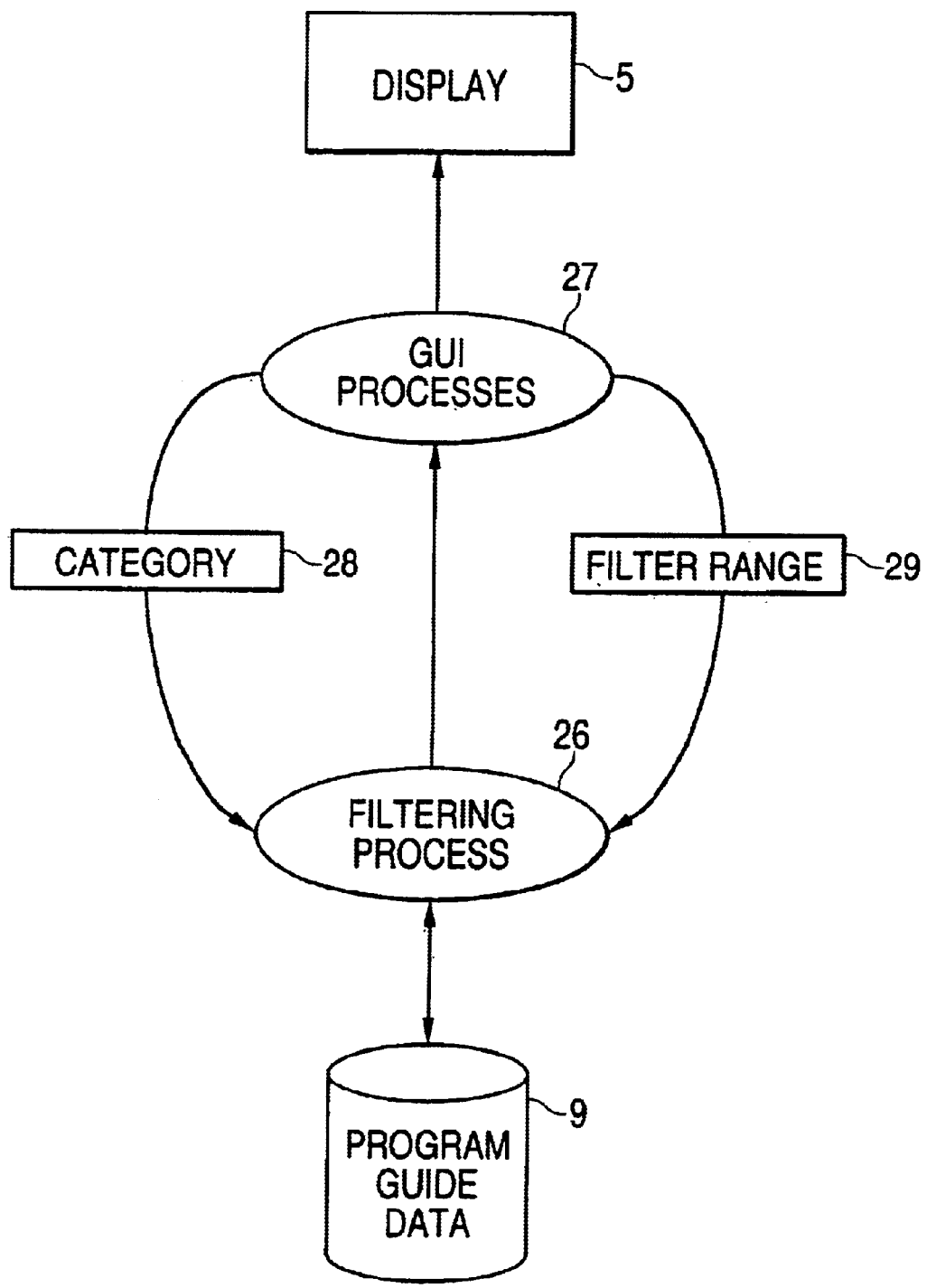

PROGRAM GUIDE DATA SELECTION DEVICE

CROSS REFERENCE TO RELATED APPLICATION

This application is related to commonly owned U.S. Ser. No. 09/891,330 entitled "Graphical User Interface Device and Method", filed on Jun. 27, 2001.

FIELD OF THE INVENTION

This invention relates to a program guide data selection device for displaying programming information concerning content available for viewing and has particular but not exclusive application to an interactive multi-channel television set for selecting content from a variety of different sources such as digital television broadcast channels and the Internet.

BACKGROUND OF THE INVENTION

Multiple channel television sets that can receive a multiplicity of digital broadcast channels via terrestrial broadcasts, satellite or cable, are becoming popular. Very large numbers of channels can be transmitted by digital techniques, and so improved channel management systems are needed to enable the viewer to make an informed selection without having to surf all of the available channels. The television set can also be used to provide Internet access so it is desirable to provide a system which can bookmark individual web sites and pages that are of interest to the user.

Proposals have been made to display a programming guide on a display screen. For example, U.S. Pat. No. 5,812,123 concerns a system for retrieving and displaying programming information in response to selection of a category of programming information. Programming information is presented via a schedule display having a category display, a subcategory display and a program display. The category display displays an array of category tiles representing categories of programming information. The subcategory display comprises an array of subcategory tiles representing subcategories that are associated with the categories of the category display. The program display displays an array of program tiles that are associated with the subcategories of the subcategory display. A viewing panel extends along each of the displays for displaying one each of the category, subcategory, and program tiles. Classes of programming information are selected by scrolling the tiles of the associated displays until the desired class items are presented within the viewing panel.

U.S. Pat. No. 5,737,029 concerns a television reception controller that enables the viewer to choose a favorite program from among many broadcasting channels easily and swiftly. The controller displays labels of categories that are News, Movie, Sports, Politics and Music on the top row of the display screen and displays pictures of broadcasting channels of the leftmost category, which have been received in the last four weeks, in small frames in the leftmost column of the screen downwardly in the order of the frequency of reception. The controller responds to the horizontal movement of a cursor to rotate the category labels horizontally and responds to the vertical movement of the cursor on the small-frame pictures and the action of selection to display the picture of the selected broadcasting channel in the main frame of the screen.

U.S. Pat. No. 6,243,071 discloses an interactive program guide system. The program guide system has a logically flat navigator menu structure made up of program guide categories and selectable program guide options. The program guide categories correspond to fairly broad groups of program guide features. Selectable program guide options correspond to more specific program guide features. Each program guide category has associated selectable program guide options. Program guide categories may be displayed in a row across the top of the display screen. Selectable program guide options may be displayed in the same column as the program guide category with which they are associated. A highlight region may be positioned on one of the selectable program guide options. The selectable program guide options may be scrolled using a pair of vertical cursors. A select button allows the user to select a given selectable program option. For example, if the highlight is on the selectable program guide option "by time", pressing the select button causes a control circuitry to display a time-ordered grid of television program listings on a monitor.

SUMMARY OF THE INVENTION

An object of the invention is to provide a program guide device that can be used to select and navigate between items of program data easily and intuitively.

Broadly stated, the invention provides a programming guide data selection device for selecting program guide data corresponding to available programming content, which utilises a processor operable to filter the programming guide data according to different filter categories and individual filter ranges associated with the respective categories. In accordance with the invention a graphical user interface is provided with first and second transversely extending scroll bars which each comprise a plurality of scroll bar elements, the scroll bar elements of the first scroll bar signifying individual filter ranges of the filter categories, such that when selected individually, the scroll bar elements of the second scroll bar signify individual program content items from the program data that fall within the filter category and range of the selected first scroll bar element, at least one of the scroll bar elements of the first scroll bar comprising a multiple depiction of more than one of said individual filter ranges of filter categories, whereby an individual one of the filter ranges may be selected from the multiple depiction.

The device may be operable to perform multiple filtering whereby scroll bar elements of the first scroll bar are selected successively, and the scroll bar elements of the second scroll bar signify individual program content items from the program data that fall within the filter categories and ranges of all of the successively selected first scroll bar elements.

The invention also includes a method of selecting program guide data using the interface, and a computer program to provide the interface.

BRIEF DESCRIPTION OF THE DRAWINGS

Further objects and advantages of the invention will be better understood from the following detailed description in conjunction with the accompanying drawings wherein:

FIG. 3 is a schematic illustration of a display of the graphical user interface provided on the television set, showing vertical and horizontal scroll bars;

FIG. 4 illustrates a filtering process carried out by the processor shown in FIG. 2;

DETAILED DESCRIPTION

Figure 1:
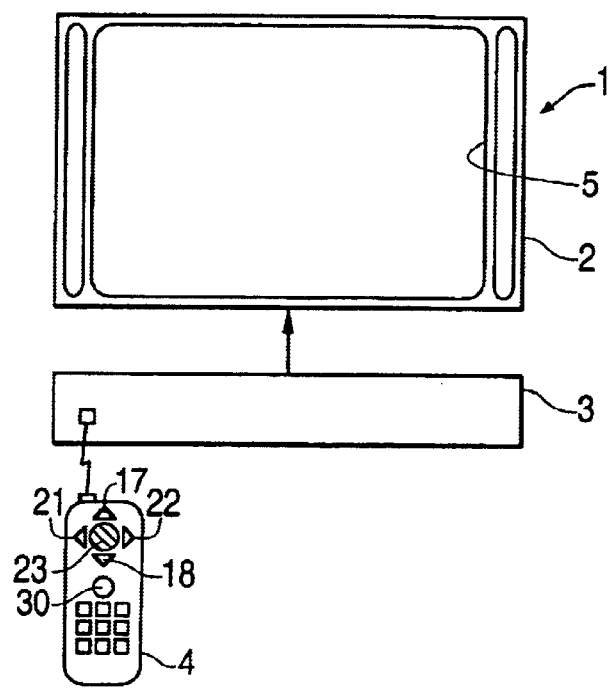
FIG. 1 is a schematic illustration of a television set and an associated infrared remote controller.

Referring to FIG. 1, a home entertainment center 1 includes a television display monitor 2, control unit 3 and a handheld remote controller 4 coupled through a wireless link e.g. infrared, to the control unit 3.

The TV monitor 2 is configured to display content from a plurality of a different sources such as satellite transmissions, terrestrial transmissions, cable transmissions and materials received through the Internet as well as locally stored content. Thus, the TV monitor 2 may comprise a conventional television set and the control unit 3 may comprise a set top box providing suitable signals to the television set 2. Alternatively, the TV monitor 2 may be solely a monitor and the control unit 3 provides data for direct display on the monitor. As another alternative, the units 2, 3 may comprise a personal computer. In the following example, the TV monitor 2 comprises a conventional television set with a display screen 5 and the control unit 3 comprises a set top box configured to receive multi-channel digital broadcast transmissions via satellite and cable, and also is provided with an Internet connection.

Figure 2:
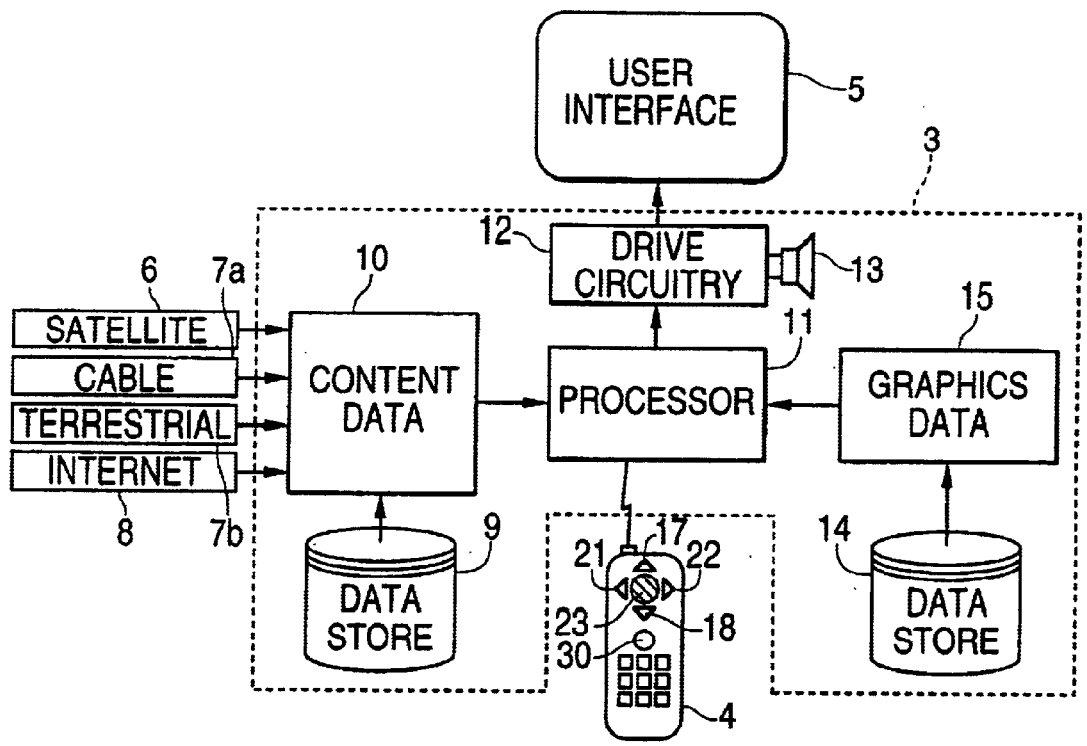
FIG. 2 is a schematic block diagram illustrating the circuitry of the arrangement shown in FIG. 1.

The major circuit components of the set top box are shown in more detail in FIG. 2. The set top box 3 shown within dotted outline receives digital satellite multi-channel transmissions from a satellite source 6 shown schematically. Similarly, terrestrial and cable digital transmissions are received from sources 7a, 7b. The set top box 3 also has an Internet connection 8.

The set top box 3 may also include a device for retrieving digital data from a pre-recorded source, such as a DVD or hard disc shown schematically as data store 9.

Programming content data from the sources 6, 7, 8 and 9 is fed to content data control circuitry 10 that appropriately passes or otherwise prepares the data from the individual source for display on the screen 5 of the TV monitor 2. Selection of the programming content data to be displayed is made by means of the infrared controller 4, which controls operation of a program controlled processor 11. The controlling program provides the graphics user interface. The program may be stored in ROM in the processor 11 or in the data store 14.

The data selected by the processor 11 is fed to drive circuitry 12 to render the data in an appropriate form for display by the TV display screen 5. As well known in the art, the data also includes audio data that is fed to a loudspeaker shown schematically by loudspeaker 13. It will be understood that the circuitry includes appropriate D to A converters although these are not shown in order to simplify the description. The loudspeaker 13 may comprise a conventional loudspeaker in the TV monitor rather than in the set top box 3 as shown.

In order to assist the viewer in making a choice of program to view, the data store 9 contains data corresponding to a programming guide with a list of content to be broadcast on the available channels with transmission times and summaries of the programming content. The programming guide data may be downloaded from the individual content sources 6, 7 and 8 or may be provided by an individual content provider in respect of all available channels.

The set top box 3 is configured to provide a graphical user interface on the display screen 5 to display the programming content data and enable the user to select the content source to be displayed. Data for the graphical user interface is held in a data store 14 and is supplied to the processor 11 by graphics display circuitry 15, so as to be included in the display on screen 5.

An example of the graphical user interface is shown in FIG. 3. The interface comprises a vertically extending scroll bar V which extends generally vertically adjacent to the left hand side edge of screen 5, together with a horizontally extending scroll bar H that extends generally horizontally adjacent to the lowermost horizontal edge of screen 5. The scroll bars intersect in a focus region 16 in the lower left hand corner of the display 5.

Each of the scroll bars V, H comprises a series of scroll bar elements $V_0$–$V_M$ and $H_0$–$H_N$. Considering the vertical scroll bar V, the scroll bar elements $V_0$–$V_M$ comprise individual object fields in which information concerning sources of program content can be displayed. In this example, the vertical scroll bar elements comprise essentially two-dimensional rectangular displays. The scroll bar elements V can be scrolled vertically through the focus region 16 by the use of "up" and "down" scroll buttons 17 and 18, so as to achieve scrolling in the direction of arrow 19 shown in FIG. 3. The scroll bar elements $H_0$–$H_N$ comprise depictions of three-dimensional elements that include more than one object field. In the example of FIG. 3, the horizontal elements comprise polygonal elements, in the form of a three dimensional rectangular block for which the individual faces or facets comprise individual object fields. The horizontal scroll bar H can be scrolled left and right in horizontal scrolling direction 20 under the control of "left" and "right" scrolling buttons 21, 22 on the remote controller 4 shown in FIG. 1. Thus, the horizontal scroll bar can be scrolled so as to move the individual scroll bar elements into the focus region 16. The user interface is so arranged that when an individual horizontal scroll bar element is moved into the focus region 16, the object fields for the vertically extending scroll bar elements V are populated with a group of objects which signify individual content sources i.e. to provide details concerning content sources that fall within a group associated with the individual horizontal scroll bar element displayed in the focus region 16. The population of the individual vertical scroll bar elements with the content source information may be initiated by depressing a select button 23 on the remote controller 4 shown in FIG. 1.

It will be understood that not all of the M and N available vertical and horizontal scroll bar elements are not necessarily displayed on display screen 5, so that as the scrolling takes place, some of the non-displayed scroll bar elements will be brought into view and others will move out of the display area of screen 5. Also, when the vertical scroll bar elements are populated with content source information, not all the entire vertical scroll bar elements may be needed to display the information, and in this situation, only a number of them that is sufficient to the display the information are provided in the displayed vertical scroll bar.

Textual information concerning the selected programming source i.e. within the focus region 16 is displayed in a text area 24 on the display. A trailer for the selected programming content may be displayed in region 25, or the content itself if available.

According to the invention, the graphical user interface shown in FIG. 3 displays information from the programming guide data that is held in data store 9, in the object fields defined by the scroll bars. In accordance with the invention, the programming guide data is filtered using filters of different categories so that the programming guide data can be presented coherently to the user. The filter process is shown schematically in FIG. 4, in which a filtering process 26 performed by processor 11 shown in FIG. 2, filters program guide data from store 9 and passes the results to a graphical user interface (GUI) process 27, which gives rise to the display shown in FIG. 3 on the display screen 5.

The user can control the filtering process 26 through the GUI process 27, by use of the remote controller 4 shown in FIG. 2. The filtering can be carried out according to different user selectable filter categories 28 and the user can also select a filtering range 29 for each category. An example of three filter categories and associated filter ranges is illustrated in Table 1.

TABLE 1

| Cat. No. | Filter Category | Filter Range | | | | | |
|---|---|---|---|---|---|---|---|
| | | 0 | 1 | 2 | 3 | 4 | 5 |
| 1 | Time | All Times | Showing now | 18.00–20.00 hrs today | 20.00–22.00 hrs today | Tomorrow | Thursday |
| 2 | Channel | All Channels | Channel 3 | Channel 4 | Channel 5 | Eurosport | MTV |
| 3 | Programming content type | All types | Films | Sport | News | Comedy | Children |

Referring again to FIG. 3, the individual faces of the rectangular, horizontal scroll bar elements H are assigned individual filter category ranges as their object fields. Thus, as shown in FIG. 3, the forward facing individual facets of horizontal scroll bar elements H0–H5 correspond to filter category 1, range 0, -filter category 1, range 5. Corresponding filter category ranges for filter categories 2 and 3 are depicted on other facets of the horizontal elements. Thus, as shown in FIG. 3, individual filter ranges for filter category 2 are disposed on the uppermost facets of the scroll bar elements. It will be understood that further categories with individual ranges can be displayed on other facets of the horizontal scroll bar elements and it will be understood that additional or other filter categories and filter ranges than those shown in Table 1 may be employed.

The outcome of the filtering process is displayed in the individual vertical scroll bar elements V0–V6. In order to display the outcome of filtering, the programming data according to a particular category and range can be displayed in the vertical scroll bar elements by moving the relevant facet of the horizontal scroll bar into the focus region 16. For example, as shown in FIG. 3, filter category 1, range 1 has been selected for display, by moving the relevant facet of scroll bar element H1 into the focus region 16. As a result, program numbers 1–5 are displayed in vertical scroll bar elements V2–V6. These programs comprise those items of programming data stored in the store 9 that fall within the selected filter category and filter range. One of the individual programs can then be selected for preview, or for example to set the video recording function, by scrolling the vertical scroll bar elements in vertical scrolling direction 19 into the focus region 16. Then, a trailer or preview may be displayed in the programming content window 25 and optionally, if appropriate, the processor may be set to record the relevant program information, when broadcast, in data store 9 for subsequent replay. If however, the selected programming content is currently being broadcast or itself stored in store 9, it may be displayed in real time in the window 25. Information text area 24 displays textual information about the programming content selected within the focus region 16.

It will be understood that different ranges of the filter category 1 may be selected by moving the relevant scroll bar element into the window 16. Also, different filter categories can be selected by rotating the scroll bar about axis X–X' in the direction of arrow Z. This is carried out by operation of a rotate button 30 on the remote controller 4 shown in FIG. 2.

Figure 7:
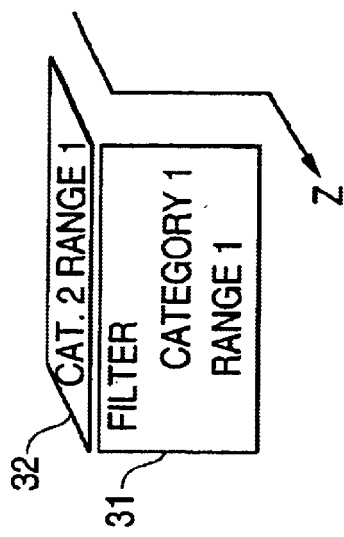
FIGS. 5, 6 and 7 illustrate alternative configurations for the scroll bar elements.
Figure 6:
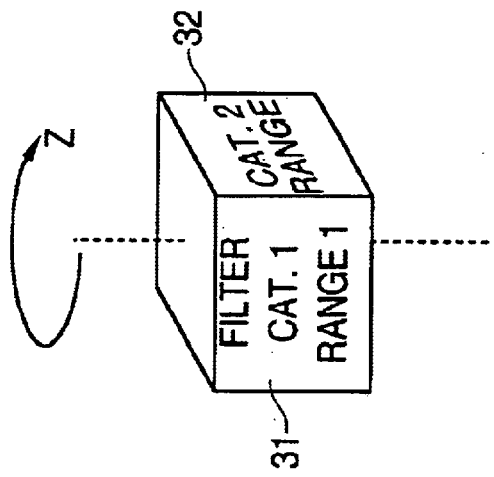
Figure 5:
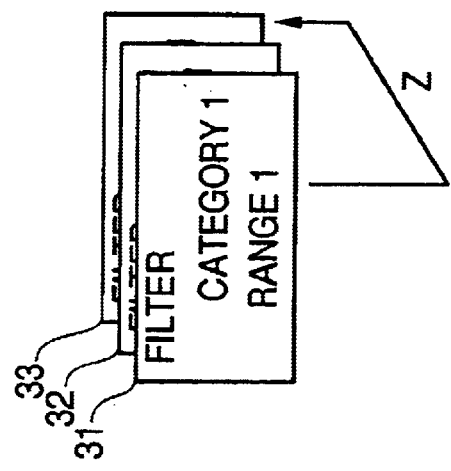

Alternative forms of scroll bar element are shown in FIGS. 5, 6, and 7. FIG. 5 illustrates an alternative form of the horizontal scroll bar element H₂ shown in FIG. 3. As previously explained, three rectangular facets of the three dimensional rectangular block shown in FIG. 3 signify individual filter category ranges. In the modification of FIG. 5, the three facets are configured as a three dimensional stack of files 31–33 which contain three individual groupings associated with block H₂ i.e. filter category 1 range 2; filter category 2 range 2; and filter category 3 range 2. Operation of the rotate button 30 on controller 4 causes the facets to be shuffled so that the first, active file is taken to the back of the stack. Thus, as shown in FIG. 5, the file 31 is currently active and on operation of the button 30, is moved in the direction of arrow Z to the back of the stack, so as to reveal file 32. Further operations of the rotate button 30 successively offer the files in the stack for selection.

Another modification is shown in FIG. 6 in which the individual scroll bar elements are configured to rotate about a vertical axis rather than the horizontal axis X–X' shown in FIG. 3. Thus, successive operations of the rotate button 30 of the controller 4 cause the block to rotate about the vertical axis in the direction of arrow Z to select the facets as previously described.

In the modification of FIG. 7, the three dimensional rectangular block H₂ is depicted in a more schematic form, with only two of the facets being shown, so as to display to the user the active face 31 together with the next available face 32 available for selection. Operation of the rotate button 30 causes facet 32 to move into the position of facet 31, which itself moves out of view. Facet 32 then becomes replaced by facet 33. Although the facets 31, 32 are shown as if they are part of a rectangular block, their angular disposition need not be at right angles; a non-rectangular configuration could be used if desired.

A more detailed example of the invention will be described with reference to FIGS. 8, 9 and 10 which illustrate use of the graphical user interface of FIG. 3 for the filter categories and ranges shown in Table 1.

The stored programming data in data store 9 may be organised as set out in Table 2.

TABLE 2

| Title | Summary text data | Date & Time | Channel | Video Preview data | Content type | Rating | Other |
|---|---|---|---|---|---|---|---|
| Friends | In this episode . . . | Dd.mm.yyyy Hh.ss | 05 | Yes | Comedy | | |
| Dinosaurs | Watch them become extinct . . . | Dd.mm.yyyy Hh.ss | 03 | No | Children | | |
| Baywatch the Movie | A feast of sun-drenched . . . | Dd.mm.yyyy Hh.ss | 03 | Yes | Film | | |

As shown in Table 2, each programming content item is stored with associated data. Taking the program "Friends" shown in Table 2 as an example, summary text data is provided for display in the window 24. The date, time and duration of showing of the program is included together with the channel concerned. Optionally, video preview data may be provided so that a preview can be displayed in the programming content window 25 shown in FIG. 3. The programming content type is also listed e.g. sport, news, comedy, children and the like. A rating for example for parental guidance may also be provided. It will be understood that other categorisations may also be included within the data, for analysis using appropriate category filters in the filtering process 26.

Figure 8:
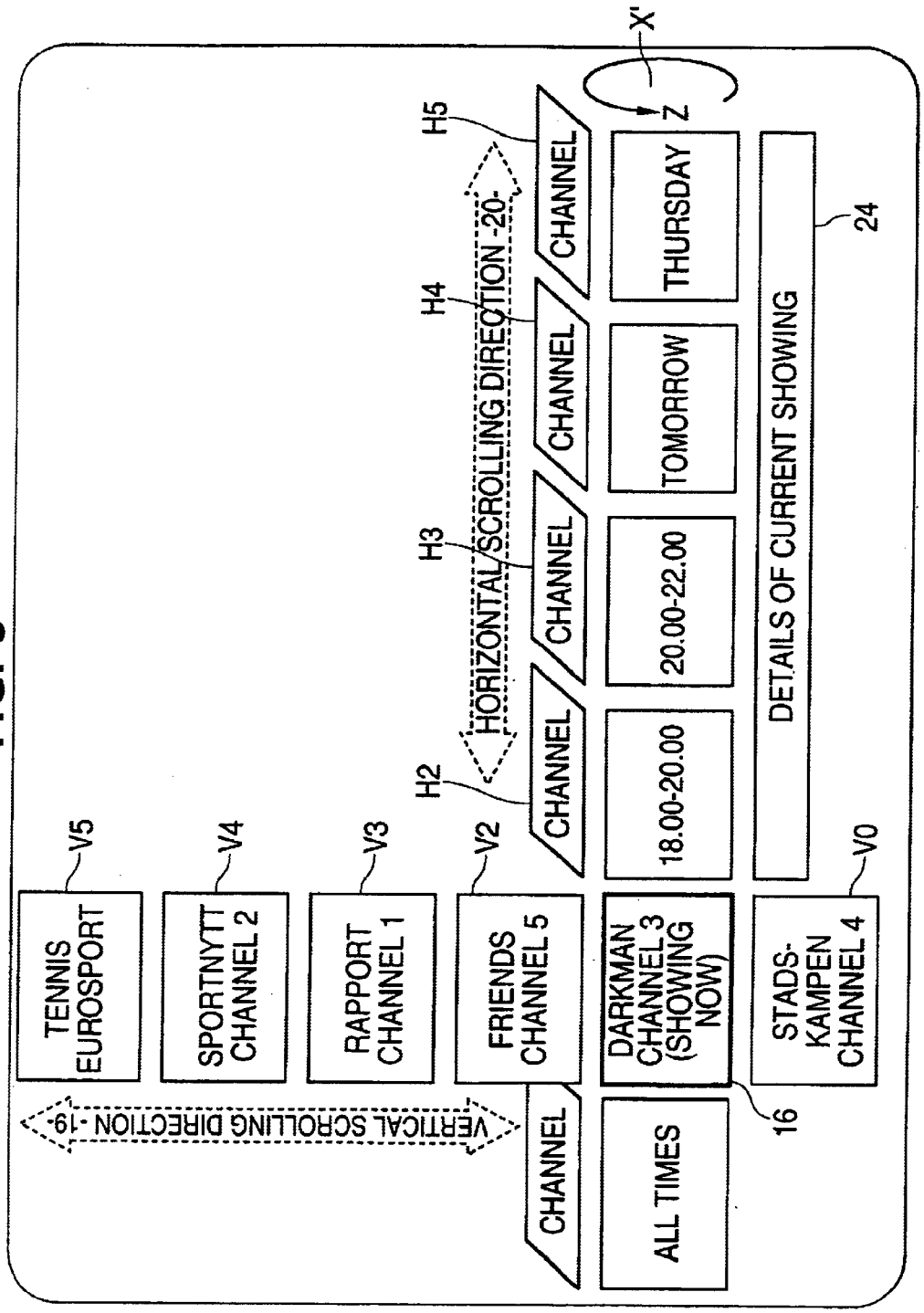
FIGS. 8, 9 & 10 illustrate the graphical user interface when filtering is performed for time, channel and programming type categories respectively.

Referring to FIG. 8, it will be seen that the display of the horizontal scroll bar elements corresponds to the configuration of FIG. 7. When the graphical user interface is initially switched on, facet 34 corresponding to a filter option of "all times" is configured by way of default in the focus guide region 16 so that all programs items in the program data from store 9 populate the vertical scroll bar elements V. Thereafter, as shown in FIG. 8, the horizontal scroll bar is moved in the horizontal scrolling direction 20 so that range 1 of filter category 1 is shifted into the focus region 16, namely "showing now", as specified in Table 1. As a result, the filtering process 26 shown in FIG. 4 is set so as to select filter category 1 i.e. "time" with a filter range 1 i.e. "showing now". The filtering process 26 thereby selects from the program guide data in store 9 programming content items which correspond to the filtering criteria. The results of the filtering are displayed in the vertical scrolling elements V0–V5 etc as illustrated in FIG. 8. The user can then scroll the vertical scroll bar in direction 19 to make an appropriate channel selection. To this end, the selected channel is moved into the focus region 16 as an appropriate button is pressed on the remote controller 4 to select the channel concerned.

If it is desired to select a different time range, for example "tomorrow" the horizontal scroll bar is shifted to the left in the horizontal scrolling direction 20 so that horizontal element H4 is moved into the focus region 16, in which case the vertical scrolling elements will be populated with all programming content which satisfies the filtering criteria for "tomorrow" i.e. programming content with an appropriate date and time range as specified in is Table 2. The scroll bar 19 can then be scrolled vertically to select a particular program of interest and the result may be used to program a video recording function in order to record the program content when broadcast, in the data store 9.

Figure 9:
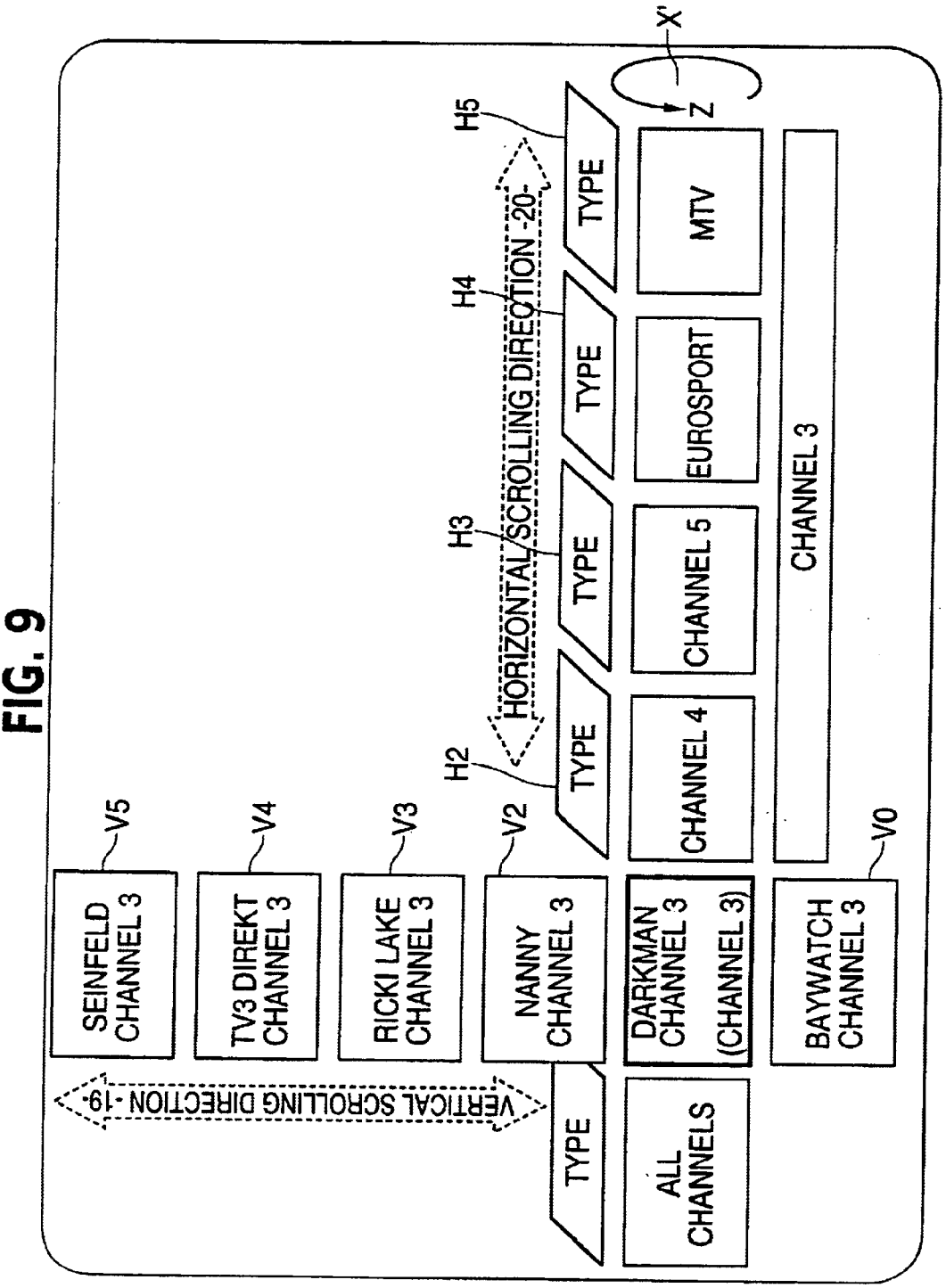

If it is desired to make a selection on the basis of channel, the horizontal scroll bar H is rotated in the direction of arrow Z as previously described, using control buttons on the remote control 4, so as to bring the facets of the scroll bar elements that signify channel designations to the front, as shown in FIG. 9. Then filtering can be carried out as previously described by shifting the horizontal scroll bar in scrolling direction 20 such that the desired channel designation is moved into the focus region 16. Thereafter, vertical scroll bar is populated with programming content for the selected channel.

Figure 10:
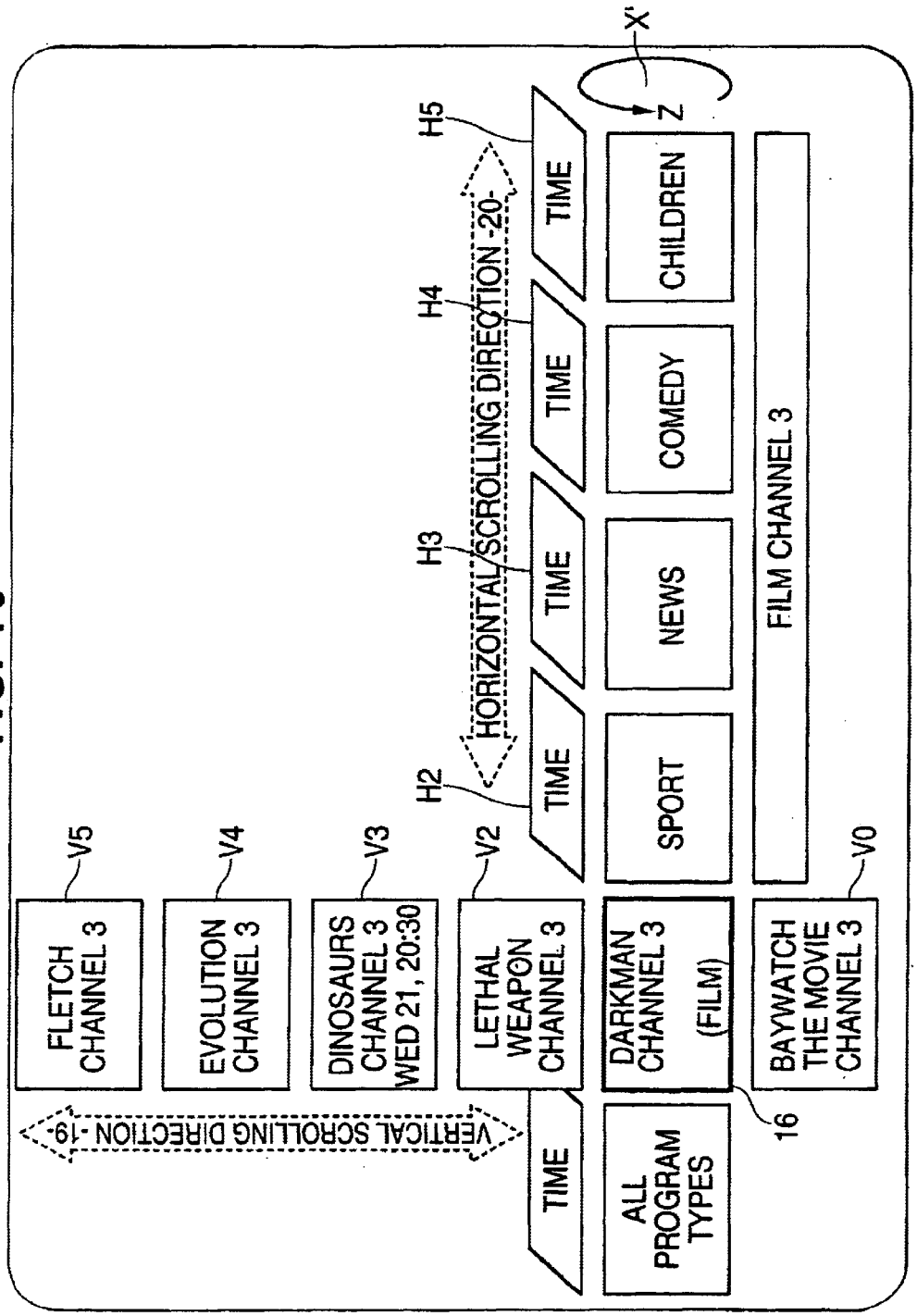

Similarly, as shown in FIG. 10, the horizontal scroll bar may be rotated a further time in order to present facets corresponding to program types, which can then be selected by horizontal movement of the scroll bar in direction 20, into the focus region 16.

Multiple filtering operations may be carried out with this arrangement to enable the user to specify a programming requirement more precisely. For example, a first filtering operation may be carried out, for example to choose a particular time range as described with reference to FIG. 8. Then, a second filtering process may be carried out, for example according to program type by rotating the horizontal scroll bar and performing a second filtering operation to bring a selected program type facet into the focus region 16 as shown in FIG. 10. After the first filtering operation, the programming content specific to the selected time range will be displayed in the vertical scroll bar elements. Thereafter, when the second filtering operation is performed according to program type, only programming content that satisfies both the time range and the program type filtering operations will be displayed in the vertical scroll bar elements. The combination of searches may occur automatically when multiple filtering operations are selected in succession and the filtering process may be re-set by moving the "all times" facet 34 back into focus region 16, or the corresponding "all channels" facet 35 shown in FIG. 9 or the "all program types" facet 36 shown in FIG. 10. Alternatively, a predetermined button on the remote controller 4 may be used to re-set the filtering process.

In a modification, the individual filter settings which make up a multiple filtering operation may be displayed in a small region of the screen 5 to provide a record of the successive filtering operations selected in combination by the user. The user may then switch off some or all of the filtering options individual using the remote control in order to change the filtering criteria.

In another modification, sub-filter types are provided when an individual filter category has been selected. For example when the user scrolls to the category-programming content type (category 3 of Table 1) and selects filter range 2 i.e. sport, a sub-filter option may be provided e.g. tennis, football and other types of sport. Once the sport filter range is activated, new filter categories are established corresponding to the sub-filter types and are displayed in individual facets of the horizontal scroll bar, so that they can selected individually by appropriate manipulation of the horizontal scroll bar into the focus region 16.

Further filtering categories may be provided. For example, a category corresponding to "media" may be provided which allows programming content to be selected according to its mode of delivery e.g. TV broadcast, Internet, radio, chat and the like. Also, a category corresponding to "rating" may be included to provide filter options depending on how broadcasters categorise their transmissions pertaining to age, sex or violence, for parental guidance or other purposes.

The user interface can also be used in a different mode to select live programming content. The horizontal scroll bar elements can be personalised for individual users of the home entertainment device. For example in a family, the scroll bar can be configured for use by father, mother, son and daughter, with each family member being allocated a row of the horizontal scroll bar elements. More specifically, the horizontal scroll bar element $H_1$ may specify "news" for use by the father. When horizontally scrolled into the focus region 16 and depressing the select button 23 on the remote controller, the vertical scroll bar elements are populated with details concerning content sources that the father has selected to form a group associated with "news" for the horizontal scroll bar element $H_1$. Having selected the scroll bar element $H_1$ for "news" in the focus region 16, the user can then operate the vertical scrolling keys 17, 18 on the controller 4 to scroll the vertical scroll bar V so as to move one of the vertical scroll bar elements V into the focus region 16. The vertical scroll bar elements may individually signify different sources of news programming. When the desired vertical scroll bar element has been scrolled into the focus region 16, the select button 23 of the controller 4 is operated, which results in the programming source being selected and displayed on the display screen 5.

What is claimed is:

1. A programming guide data selection device for selecting program guide data corresponding to available programming content, comprising:

a processor operable to filter the programming guide data according to different filter categories and individual filter ranges associated with the respective categories, and a graphical user interface to provide first and second transversely extending and intersecting scroll bars which each comprise a plurality of scroll bar elements that can be scrolled successively through a focus region positioned at the intersection of the first and second scroll bars, the scroll bar elements of the first scroll bar signifying individual filter ranges of the filter categories, which are individually selectable by being scrolled into the focus region, such that when selected individually, the scroll bar elements of the second scroll bar signify individual program content items from the program data that fall within the filter category and range of the selected first scroll bar element, said individual program content items being individually selectable by scrolling the second scroll bar to place the element of the second scroll bar corresponding to the program item into the focus region, at least one of the scroll bar elements of the first scroll bar comprising a multiple depiction of more than one of said individual filter ranges of the filter categories selectable from the multiple depiction individually by being moved into the focus region, and a viewing region for viewing a program content item selected in the focus region.

2. The device of claim 1 wherein the multiple depiction of said more than one filter category ranges comprises a three dimensional depiction thereof.

3. The device of claim 1 wherein the scroll bar elements of the first scroll bar include multiple facets that signify individual filter ranges of different categories.

4. The device of claim 1 wherein the scroll bar elements of the first scroll bar are polygonal and are rotatable about a common axis extending longitudinally about the first scroll bar.

5. The device of claim 4 wherein the elements are rotatable in unison about said axis.

6. The device of claim 2 wherein the scroll bar elements of the first scroll bar each include facets associated with respective different filter categories.

7. The device of claim 1 further including a controller operable by a user to scroll the scroll bars individually through the focus region.

8. The device of claim 7 wherein the controller includes a selector device to select an individual scroll bar element corresponding to a filter category and range.

9. The device of claim 7 wherein the controller includes a selector device to select a filter category and range corresponding to an individual scroll bar element when scrolled into the focus region.

10. The device of claim 1 wherein the processor is operable to perform multiple filtering whereby scroll bar elements of the first scroll bar are selected successively, and the scroll bar elements of the second scroll bar signify individual program content items from the program data that fall within the filter categories and ranges of all of the successively selected first scroll bar elements.

11. An interactive display device for displaying content from a plurality of different sources thereof on a display screen, including a programming guide data selection device for selecting program guide data corresponding to available programming content, comprising:

a processor operable to filter the programming guide data according to different filter categories and individual filter ranges associated with the respective categories, a graphical user interface to provide a display on the display screen that includes a focus region, first and second transversely extending scroll bars which intersect in the focus region, and which each comprise a plurality of scroll bar elements, the scroll bar elements of the first scroll bar signifying individual filter ranges of the filter categories, which are individually selectable by being scrolled into the focus region, such that when selected individually, the scroll bar elements of the second scroll bar signify individual program content items from the program data that fall within the filter category and range of the selected first scroll bar element, said individual program content items being individually selectable by scrolling the second scroll bar to place the element of the second scroll bar that corresponds to the program item into the focus region, at least one of the scroll bar elements of the first scroll bar comprising a multiple depiction of more than one said individual filter ranges of filter categories, selectable from the multiple depiction individually by being moved into the focus region, and a controller operable by a user to scroll the scroll bar elements of the first and second scroll bars through the focus region to select individual program items.

12. The device of claim 11 further including the display screen.

13. The device according to claim 11 comprising a control unit for a multi-channel television set.

14. The device according to claim 13 and comprising a set top box.

15. The device of claim 11 configured to receive programming data selected from a group consisting of satellite transmissions, cable transmissions, the Internet and pre-recorded digital data.

16. The device of claim 11 wherein the controller comprises a handheld device connected to the circuitry by a wireless link.

17. A data carrier provided with a program to be run by a processor to provide as graphical user interface for a programming guide data selection device which is operable to select program guide data corresponding to available programming content, the interface including a focus region, first and second transversely extending scroll bars which intersect in the focus region and which each comprise a plurality of scroll bar elements, the scroll bar elements of the first scroll bar signifying individual filter ranges of the filter categories, which are individually selectable by being scrolled into the focus region, such that when selected individually, the scroll bar elements of the second scroll bar signify individual program content items from the program data that fall within the filter category and range of the selected first scroll bar element, said individual program content items being individually selectable by scrolling the second scroll bar to place the element of the second scroll bar that corresponds to the program item into the focus region, at least one of the scroll bar elements of the first scroll bar comprising a multiple depiction of more than one of said individual filter ranges of filter categories, selectable from the multiple depiction individually by being moved into the focus region.

18. A method of operating a graphical user interface to select content items form programming guide data the user interface including a focus region, first and second transversely extending scroll bars which intersect in the focus region and which each comprise a plurality of scroll bar elements, the scroll bar elements of the first scroll bar signifying individual filter ranges of filter categories, which are individually selectable by being scrolled into the focus region. such that when selected individually, the scroll bar elements of the second scroll bar signify individual program content items from the program data that fall within the filter category and range of the selected first scroll bar element, said individual program content items being individually selectable by scrolling the second scroll bar to place the element of the second scroll bar that corresponds to the program item into the focus region, at least one of the scroll bar elements of the first scroll bar comprising a multiple depiction of more than one of said individual filter ranges of filter categories, whereby an individual one of the filter ranges may be selected from the multiple depiction, the method comprising:

selecting an individual filter range and category from the multiple depiction for an individual one of the scroll bar elements of the first scroll bar by moving the selected depiction into the focus region;

displaying program content items form the programming data corresponding to the selected an individual filter range and category in the scroll bar elements of the second scroll bar, and selecting one of the program items by scrolling the second scroll bar to place the item to be selected into the focus region.

19. The method of claim 18 wherein the selecting from the multiple depiction includes rotating the elements of the first scroll bar.

20. The method of claim 18 wherein the selecting from the multiple depiction includes shuffling facets which signify the individual filter category ranges.

21. The method of claim 18 including performing multiple filtering whereby scroll elements of the first scroll bar are selected successively, and such that the scroll bar elements of the second scroll bar signify individual program content items from the program data that fall within the filter categories and ranges of all of the successively selected first scroll bar elements.

* * * * *